United States Patent
Fujishima et al.

(10) Patent No.: US 12,140,913 B2
(45) Date of Patent: Nov. 12, 2024

(54) CONTROL DEVICE, UNMANNED SYSTEM, CONTROL METHOD, AND PROGRAM

(71) Applicant: MITSUBISHI HEAVY INDUSTRIES, LTD., Tokyo (JP)

(72) Inventors: Yasuo Fujishima, Tokyo (JP); Natsuki Matsunami, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1071 days.

(21) Appl. No.: 16/652,506

(22) PCT Filed: Nov. 2, 2018

(86) PCT No.: PCT/JP2018/040865
§ 371 (c)(1),
(2) Date: Mar. 31, 2020

(87) PCT Pub. No.: WO2019/111608
PCT Pub. Date: Jun. 13, 2019

(65) Prior Publication Data
US 2020/0285202 A1    Sep. 10, 2020

(30) Foreign Application Priority Data
Dec. 8, 2017    (JP) .................... 2017-236475

(51) Int. Cl.
*G06N 3/08*    (2023.01)
*G05B 13/02*    (2006.01)
(Continued)

(52) U.S. Cl.
CPC ........... *G05B 13/027* (2013.01); *G06N 3/045* (2023.01); *G06N 3/08* (2013.01); *G06N 3/042* (2023.01); *G06N 20/00* (2019.01)

(58) Field of Classification Search
USPC .......................................... 700/48
See application file for complete search history.

(56) References Cited

U.S. PATENT DOCUMENTS

| 5,649,066 A | 7/1997 | Lacher et al. |
| 2017/0028553 A1 | 2/2017 | Tsuda et al. |
| 2018/0009445 A1* | 1/2018 | Nishi .................. G05D 1/0221 |

FOREIGN PATENT DOCUMENTS

| JP | 2017-30137 | 2/2017 |
| JP | 2017-122981 | 7/2017 |

OTHER PUBLICATIONS

Valiollahi, "A Fuzzy Q-Learning Approach to Navigation of an Autonomous Robot" The 16th CSI International Symposium on Artificial Intelligence and Signal Processing (AISP 2012), pp. 520-525 (Year: 2012).*

(Continued)

*Primary Examiner* — Emilio J Saavedra
(74) *Attorney, Agent, or Firm* — Wenderoth, Lind & Ponack, L.L.P.

(57) ABSTRACT

A control device determines an operation scheme of an apparatus on a rule base on the basis of state information indicating the state of the apparatus or the state of an environment in which the apparatus operates, calculates a parameter for determining the content of an operation in the determined operation scheme on the basis of the state information and a learning model constructed on the basis of the operation of the apparatus based on the state information and evaluation of the operation, and commands the apparatus to execute the operation.

8 Claims, 12 Drawing Sheets

(51) Int. Cl.
G06N 3/045 (2023.01)
G06N 3/042 (2023.01)
G06N 20/00 (2019.01)

(56) References Cited

OTHER PUBLICATIONS

Paul et al., "Deterministic Policy Gradient Based Robotic Path Planning with Continuous Action Spaces" IEEE International Conference on Computer Vision Workshops (ICCVW), Oct. 22-29, 2017 pp. 725-733 (Year: 2017).*

Kerner, "Definition: Q-learning" accessed at: https://www.techtarget.com/searchenterpriseai/definition/Q-learning#:~:text=Q%2Dlearning%20is%20a%20machine,way%20animals%20or%20children%20learn on Jun. 24, 2023 (6 pg. print out provided) (Year: 2023).*

Zhang et al., "Current trends in the development of intelligent unmanned autonomous systems" Frontiers of Information Technology & Electronic Engineering, Feb. 4, 2017, 18(1) pp. 68-85 (Year: 2017).*

Stanford University School of Engineering, "Lecture 14 Deep Reinforcement Learning" Published Aug. 11, 2017, 1 hour 4 minute video, accessed at: https://www.youtube.com/watch?v=IvoHnicueoE (2 pg. print out at time marker 43:27 provided) (Year: 2017).*

Paul et al., "Deterministic Policy Gradient Based Robotic Path Planning with Continuous Action Spaces", 2017 IEEE International Conference on Computer Vision Workshops, Oct. 22, 2017, pp. 725-733.

Lillicrap et al., "Continuous Control with Deep Reinforcement Learning", Cornell University Library, 2015, pp. 1-14.

International Search Report issued Jan. 15, 2019 in International (PCT) Patent Application No. PCT/JP2018/040865.

Written Opinion of the International Searching Authority issued Jan. 15, 2019 in International (PCT) Patent Application No. PCT/JP2018/040865.

Valiollahi et al.,"A Fuzzy Q-Learning Approach to Navigation of an Autonomous Robot", Artificial Intelligence and Signal Processing (AISP), 2012, 16$^{th}$ CSI International Symposium, IEEE, May 2, 2012, pp. 520-525.

Sun et al., "Autonomous Learning of Sequential Tasks: Experiments and Analyzes", IEE Transactions on Neural Networks, Nov. 1998, vol. 9, No. 6, pp. 1217-1234.

Arulkumaran et al., "A Brief Survey of Deep Reinforcement Learning", IEEE Signal Processing Magazine, Special Issue on Deep Learning for Image Understanding (ARXIV Extended Version), Aug. 2017, pp. 1-16.

\* cited by examiner

CONTROL DEVICE, UNMANNED SYSTEM, CONTROL METHOD, AND PROGRAM

TECHNICAL FIELD

The present invention relates to a control device, an unmanned system, a control method, and a program.

BACKGROUND ART

In recent years, advances in technologies such as machine learning or deep learning have been remarkable with the improvement of the computing power of computers. In the related art, these technologies often used in the fields of measurement and image recognition have been used in a wider range of fields. For example, Patent Literature 1 discloses a machine learning device that learns, in an operation of a robot that performs a task in cooperation with a human, an operation for reducing workload of the human and improving the work efficiency by using reinforcement learning or a neural network.

CITATION LIST

Patent Literature

[PTL 1] Japanese Unexamined Patent Application Publication No. 2017-030137

Non Patent Literature

[NPL 1] T. P. Lillicrap, J. J. Hunt, A. Pritzel, N. Heess, T. Erez, Y. Tassa, and D. Silver, "Continuous Control with Deep Reinforcement Learning," Cornell University Library, 2015.

SUMMARY OF INVENTION

Technical Problem

By using a technology such as deep learning, it is possible to construct a highly accurate model that has learned characteristics that cannot be recognized by a human, but it is not possible for a human to predict what output the model will perform with respect to various inputs. Accordingly, in determining an operation of an apparatus on the basis of a model constructed by deep learning or the like, it is not possible to exclude a possibility that the apparatus performs an unintended operation, which causes a problem in controllability and safety.

The present invention provides a control device, an unmanned system, a control method, and a program capable of solving the above-mentioned problems.

Solution to Problem

According to an aspect of the present invention, there is provided a control device including: an operation selection unit that determines an operation scheme of an apparatus on a rule base on the basis of state information indicating a state of the apparatus or a state of an environment in which the apparatus is operated; an operation parameter calculation unit that calculates a parameter for determining content of the operation in the determined operation scheme on the basis of the state information and a learning model constructed on the basis of the operation of the apparatus based on the state information and evaluation for the operation; and an operation command unit that commands the apparatus to execute the operation.

According to this aspect of the present invention, the operation parameter calculation unit includes a calculation unit that calculates the parameter for determining the content of the operation on the basis of the state information and the learning model, and a learning unit that evaluates the operation based on a value of the parameter calculated by the calculation unit and updates the learning model for optimizing the parameter on the basis of the evaluation.

According to this aspect of the present invention, the learning model includes an actor neural network and a critic neural network, and the learning unit updates the actor neural network and the critic neural network by a deep deterministic policy gradient (DDPG).

According to this aspect of the present invention, the operation parameter calculation unit calculates a correction amount of the parameter for determining the content of the operation on the basis of the state information and the learning model.

According to this aspect of the present invention, the control device further includes a state estimation unit that estimates the state information on the basis of information measured by a sensor.

According to this aspect of the present invention, in the control device, the operation parameter calculation unit and the operation command unit are provided for each operation scheme, and the control device further includes a first switching unit that performs switching to the operation parameter calculation unit and the operation command unit corresponding to the selected operation scheme, in accordance with the operation scheme selected by the operation selection unit.

According to this aspect of the present invention, in the control device, the operation parameter calculation unit and the operation command unit are provided for each of the operation schemes that are a part of a plurality of the operation schemes, and the control device further includes: an operation control unit that commands predetermined operation content for each operation scheme, with respect to the remaining operation schemes among the plurality of operation schemes; and a second switching unit that switches the operation parameter calculation unit and the operation command unit corresponding to the operation scheme, or the operation control unit corresponding to the operation scheme, in accordance with the operation scheme selected by the operation selection unit.

According to another aspect of the present invention, there is provided an unmanned system including the control device according to any one of the above aspects of the present invention; and an apparatus controlled by the control device.

According to another aspect of the present invention, there is provided a control method including: a step of determining an operation scheme of an apparatus on a rule base on the basis of state information indicating a state of the apparatus or a state of an environment in which the apparatus is operated; a step of calculating a parameter for determining content of the operation in the determined operation scheme on the basis of the state information and a learning model constructed on the basis of the operation of the apparatus based on the state information and evaluation for the operation; and a step of commanding the apparatus to execute the operation.

According to still another aspect of the present invention, there is provided a program causing a computer to function as: means for determining an operation scheme of an apparatus on a rule base on the basis of state information indicating a state of the apparatus or a state of an environment in which the apparatus is operated; means for calculating a parameter for determining content of the operation in the determined operation scheme on the basis of the state information and a learning model constructed on the basis of the operation of the apparatus based on the state information and evaluation for the operation; and means for commanding the apparatus to execute the operation.

Advantageous Effects of Invention

According to the control device, the unmanned system, the control method, and the program described above, it is possible to achieve both easy understanding of control and performance improvement.

DESCRIPTION OF EMBODIMENTS

First Embodiment

Hereinafter, a control device according to an embodiment of the present invention will be described with reference to FIGS. 1 to 3.

Figure 1:
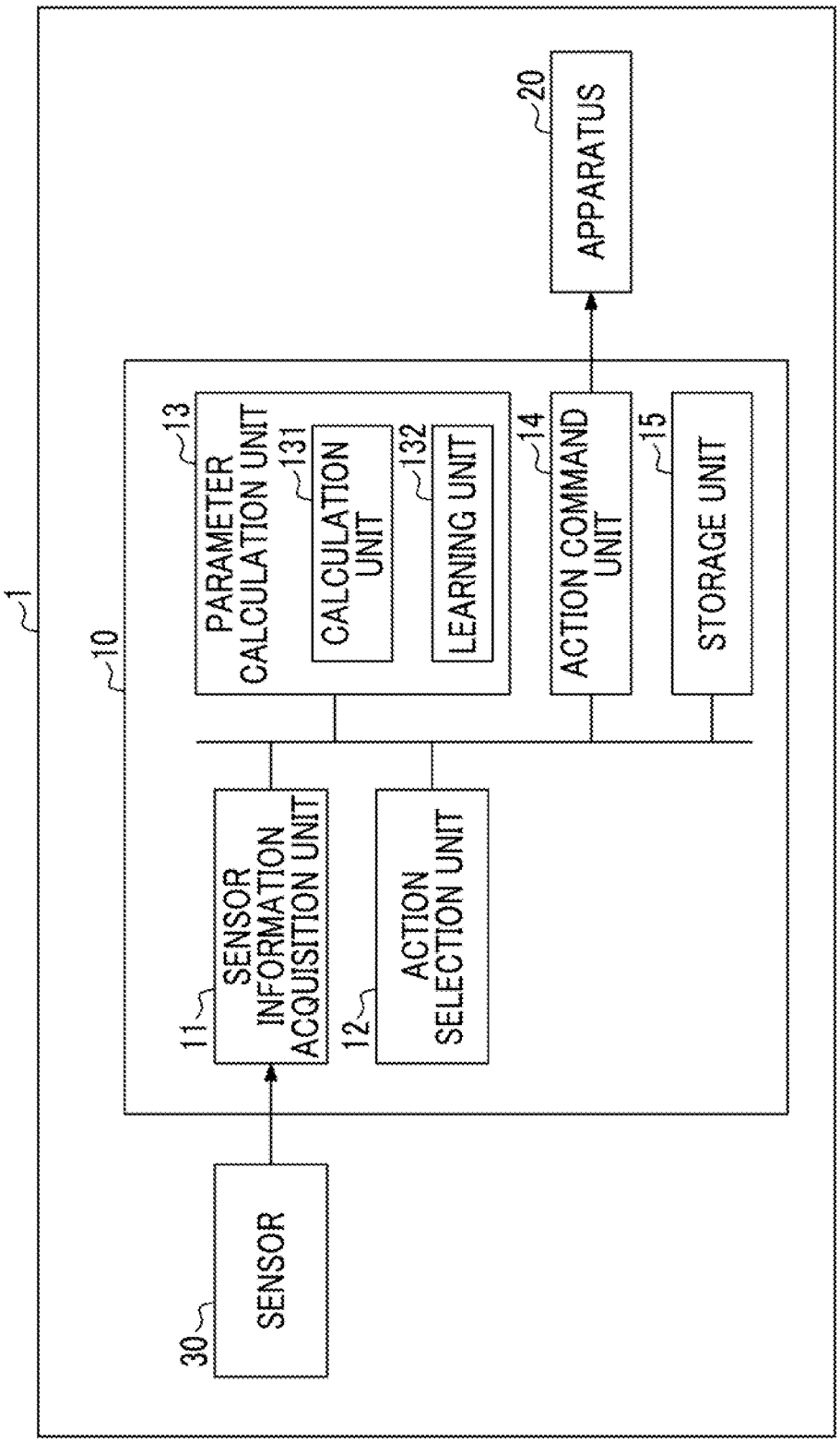
FIG. 1 is a block diagram showing an unmanned system according to a first embodiment of the present invention.

FIG. 1 is a block diagram showing an unmanned system according to a first embodiment of the present invention. An unmanned system 1 in FIG. 1 includes a control device 10, an apparatus 20, and a sensor 30.

The control device 10 is a computer that controls the apparatus 20, and includes a central processing unit (CPU) or a micro processing unit (MPU). The control device 10 and the apparatus 20 may be configured separately, or may be configured integrally. The control device 10 and the apparatus 20 are connected to each other through wired or wireless communication means, and an operation of the apparatus 20 is controlled by outputting or transmitting, for example, a control signal from the control device 10 to the apparatus 20. The control device 10 performs a control so that the apparatus 20 is in a target state in accordance with a state of the apparatus 20 and an operation environment. In general, in a case where the apparatus 20 is controlled in accordance with the operation environment or the like, there are many cases where the control device 10 determines predetermined environment information (for example, an ambient temperature, or the like) on the basis of a predetermined rule, and determines a control to be performed next (control based on an IF-THEN rule), for example, in such a manner that a control "A1" is performed in a case where the temperature is "X1" or higher and a control "A2" is performed in a case where the temperature is "X2" or higher. The control device 10 according to the present embodiment further has a function of executing a more preferable control (for example, of high efficiency, low loss, high security, desirable for a user, or the like), within a related art control scheme determined on a rule base. The apparatus 20 is an apparatus that operates in an unmanned manner such as an autonomous vehicle or an automated aerial vehicle (AAV), for example.

As shown in FIG. 1, the control device 10 includes a sensor information acquisition unit 11, an action selection unit 12, a parameter calculation unit 13, an action command unit 14, and a storage unit 15.

The sensor information acquisition unit 11 acquires information (environment information) detected by the sensor 30 related to the state of the apparatus 20 and the operation environment. The sensor 30 includes, for example, a camera, a radar, a laser radar, a 3-axis inertial sensor, a global positioning system (GPS) receiver, an acceleration sensor, a temperature sensor, an atmospheric pressure sensor, a current sensor, a rotation sensor, and the like.

The action selection unit 12 determines a scheme and a type of an operation or an action to be performed by the apparatus 20 on a rule base such as an IF-THEN rule, on the basis of environment information.

The parameter calculation unit 13 determines detailed content of an action in the scheme of the action selected by the action selection unit 12, on the basis of the environment information and a learning model constructed by learning the action of the apparatus 20 based on the environment information and evaluation for a result of the action. The parameter calculation unit 13 includes a calculation unit 131 and a learning unit 132. The calculation unit 131 calculates a parameter (hereinafter, referred to as an action parameter) for determining content of an appropriate action in accordance with the environment information on the basis of the learning model. The learning unit 132 updates the learning model by learning the action of the apparatus 20 executed using the action parameter calculated by the calculation unit 131 and the evaluation for the result of the action. For example, the learning model includes a model for calculating an action parameter (actor model) and a model for evaluating a result obtained by performing an action based on the action parameter with respect to a real environment (critic model), and the learning unit 132 updates the learning model (the actor model and the critic model) using a deep deterministic policy gradient (DDPG). Through an operation of the parameter calculation unit 13, switching between a learning mode and a non-learning mode may be performed. Thus, for example, it is possible to stop learning in an environment that is not suitable for the learning.

The action command unit 14 generates a control signal on the basis of an action parameter calculated by the parameter calculation unit 13 (calculation unit 131), and outputs the control signal to the apparatus 20.

Thus, the action command unit 14 causes the apparatus 20 to execute an action optimized by the parameter calculation unit 13 within a range of the scheme of the action selected by the action selection unit 12. The storage unit 15 stores a variety of information such as environment information acquired by the sensor information acquisition unit 11 and a learning model.

Next, a control of the apparatus 20 by the control device 10 will be described with reference to FIG. 2.

Figure 2:
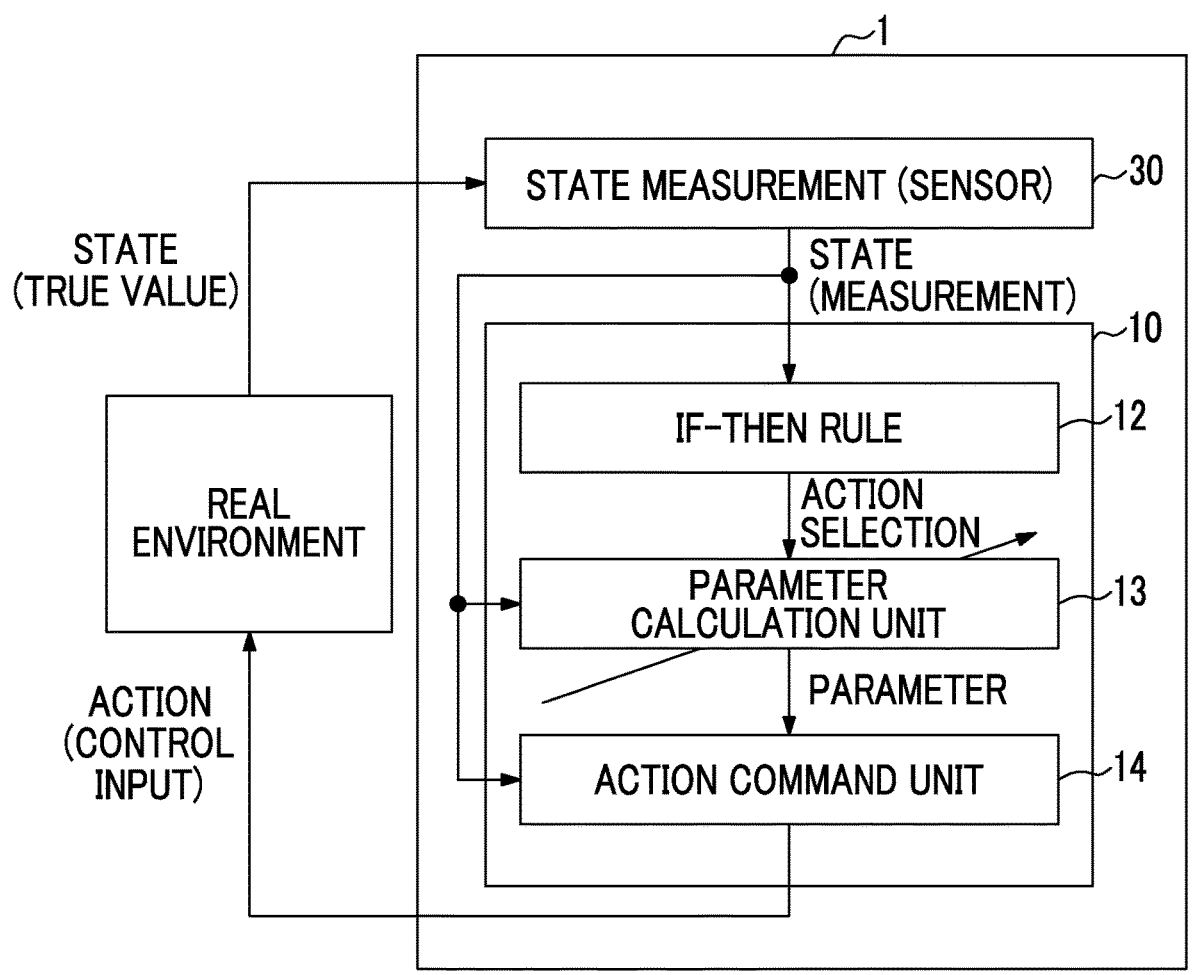
FIG. 2 is a first diagram illustrating a control by the unmanned system according to the first embodiment of the present invention.

FIG. 2 is a first diagram illustrating a control by the unmanned system according to the first embodiment of the present invention.

First, the sensor 30 measures a state of the apparatus 20 and a state of an operation environment 22 of the apparatus 20, and outputs the measured environment information to the control device 10. In the control device 10, the sensor information acquisition unit 11 acquires the environment information, and outputs the acquired environment information to the action selection unit 12, the parameter calculation unit 13, and the action command unit 14.

Then, the action selection unit 12 selects an action in accordance with the environment information on the basis of the IF-THEN rule. The action selection unit 12 outputs the selected action scheme to the parameter calculation unit 13.

Then, the parameter calculation unit 13 calculates an action parameter in the selected action scheme on the basis of the environment information and a learning model. For example, the learning model is constructed such that, in a case where the environment information is input, an action parameter for executing an optimal action in accordance with a real environment is output. The parameter calculation unit 13 (calculation unit 131) inputs the environment information to the learning model. The parameter calculation unit 13 outputs the action parameter output by the learning model with respect to the environment information to the action command unit 14.

The action command unit 14 generates a control signal for executing an action indicated by the action parameter on the basis of the action parameter acquired from the parameter calculation unit 13 and the environment information acquired from the sensor information acquisition unit 11, and outputs the control signal to the apparatus 20. The apparatus 20 acts in accordance with the control signal. This action changes the real environment. Then, the sensor 30 measures a state of the real environment again, and the control device 10 repeats the processes of selecting an action scheme by rule base, calculating an action parameter in the scheme, and commanding an action, and performing the action by the apparatus 20, on the basis of the newly measured environment information.

In control of a general apparatus 20, in many cases, a parameter for determining content of an action is determined on the basis of the IF-THEN rule such as an expert system, for example. However, even with the expert system, it is not practical to set a rule that can handle all situations. Accordingly, in this embodiment, a control scheme is basically determined on a rule base, and variable parameters in the rule are obtained by reinforcement learning. Thus, it is possible to change parameters in accordance with an actual environment, and to perform more practically suitable control. Compared with a case where all parameters are determined by the IF-THEN rule, it is possible to realize control that is more suitable for a control target or a user's preference in response to individual differences of the apparatus 20 and differences in use environments or the like. For the learning of the variable parameters, deep learning (for example, a neural network which may be sometimes referred to as an NN) may be used. For example, even in the field of system control, there is a concept such as a variable gain, but it is necessary for a person to prepare a parameter table in advance. However, in a case where the deep learning is used, it is not necessary for a human to design items to be learned, and it is possible to automatically find characteristics of an object, and to construct a model. Thus, there is a possibility that a useful learning model that can learn characteristics that cannot be noticed by humans and that can output better variable parameters can be constructed.

The determination of the action based on the rule base has an advantage that a generation ground of the action is clearly indicated by, for example, a conditional branch in the IF-THEN format, and thus, the action is excellent in readability and easy for a person to understand. Accordingly, an action caused by the apparatus 20 can be easily predicted, and can be used with high reliability in application to the real world such as cooperation with humans. On the other hand, in determining an action based on the deep learning, it is difficult for a user to know a generation ground of the action. Accordingly, for example, in a case where the apparatus 20 is used in the same environment as in a case where the learning model is constructed, the control of the apparatus 20 may be left to the learning model. However, since various unexpected phenomena may occur in a real environment, there is a case where it is not possible to rely on the learning model to control the apparatus 20 without knowing what action to take. In the technology in which the rule base and the neural network according to the present embodiment are used in combination, since the action scheme of the apparatus 20 can be determined on a rule base that can be understood by a human, it is possible to use the apparatus 20 with high reliability without greatly deviating the action of the apparatus 20 from prediction of the human. Further, with respect to the variable parameter for determining the content of the action, since a value optimized in accordance with a real environment is learned by reinforcement learning, it is possible to derive a better action.

Next, an example of the parameter calculation unit 13 will be described.

Figure 3:
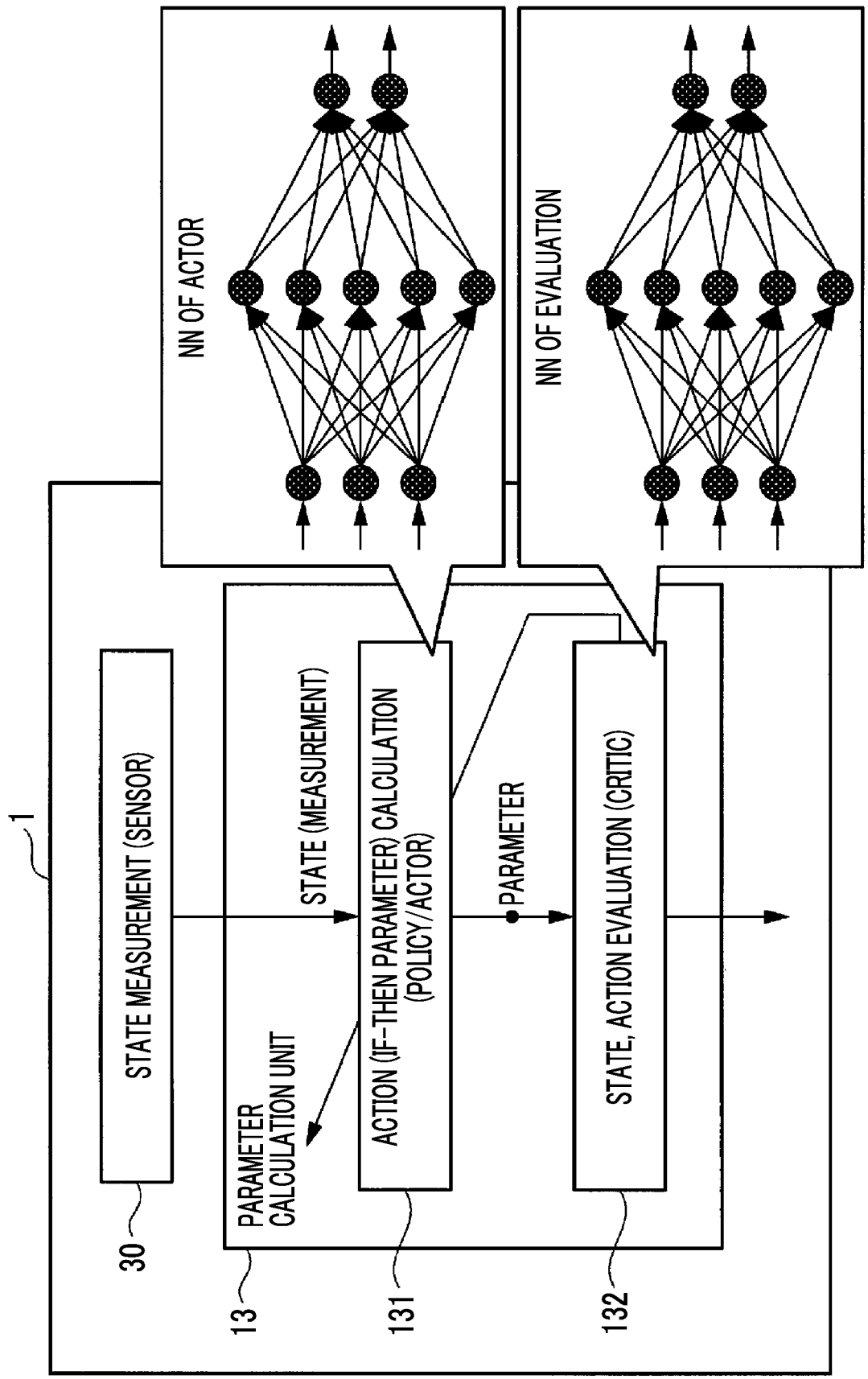
FIG. 3 is a second diagram illustrating a control by the unmanned system according to the first embodiment of the present invention.

FIG. 3 is a second diagram illustrating control by the unmanned system according to the first embodiment of the present invention.

As described above, the parameter calculation unit includes the calculation unit 131 that calculates an action parameter on the basis of a learning model and environment information, and the learning unit 132 that updates the learning model. In one example, the parameter calculation unit 13 may be realized by applying Deep Deterministic Policy Gradient (DDPG). The DDPG is a method of reinforcement learning using deep learning. The DDPG uses an actor for selecting an action (policy) and a critic for evaluating the selected action and a state caused by the action. The actor and the critic are independent neural networks. The above-mentioned learning model includes an NN of the actor and an NN of the critic. The calculation unit 131 selects an action on the basis of the NN of the actor, that is, calculates an action parameter, and the action command unit 14 commands the apparatus 20 to perform an action based on the action parameter. The learning unit 132 sets a reward on the basis of environment information generated as a result of the action, and updates the NN of the actor and the NN of the critic. An example of a specific updating process will be described later (fourth embodiment). The process of updating the learning model (the NN of the actor and the NN of the critic) on the basis of the reward corresponds to reinforcement learning, in which an action is actually generated and is reflected in a real environment, and the result is fed back as a policy function (the NN of the actor), to thereby gradually generate a good action.

According to the unmanned system 1 of the present embodiment, it is possible to achieve both easy understanding of an action generation ground that is an advantage of rule base of related-art and performance improvement that is an advantage of reinforcement learning. Unlike the related-art expert system, it is possible to automatically acquire a variable parameter in control by learning.

By continuously updating the learning model in parallel with the operation of the apparatus 20, it is possible to continuously maintain a highly accurate learning model in which the aging of the apparatus 20 or the like is reflected, to thereby continuously extract the performance of the apparatus 20.

Second Embodiment

Hereinafter, an unmanned system according to a second embodiment of the present invention will be described with reference to FIGS. 4 to 5. The second embodiment has a configuration extended from that of the first embodiment, in which in a case where information that cannot be measured is necessary for determining an action parameter, an unmanned system 1A and a control device 10A having a function of estimating the information.

Figure 4:
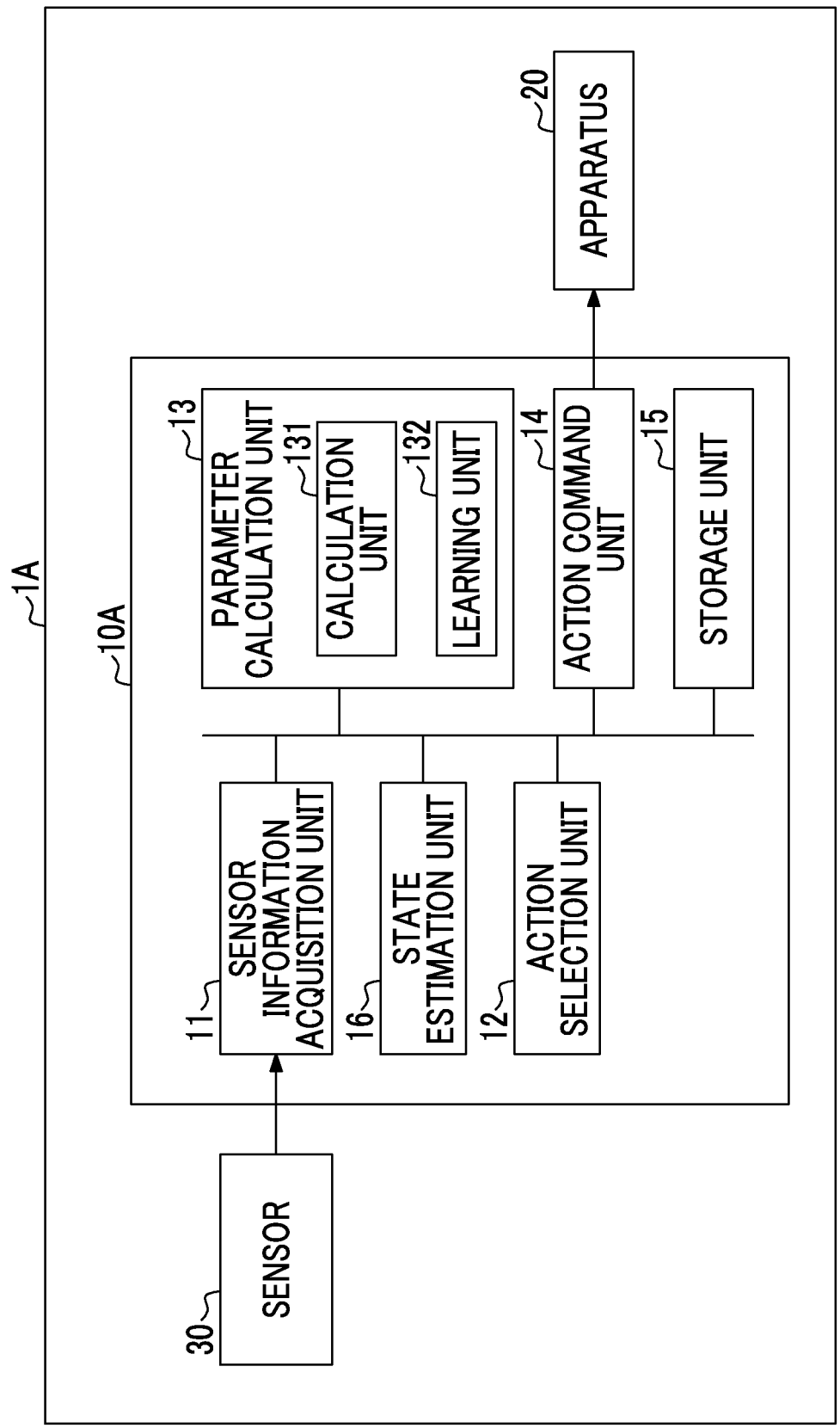
FIG. 4 is a block diagram showing an unmanned system according to a second embodiment of the present invention.

FIG. 4 is a block diagram showing the unmanned system according to the second embodiment of the present invention.

In the configuration according to the second embodiment, the same components as those included in the unmanned system 1 according to the first embodiment are denoted by the same reference numerals, and description thereof will be omitted. The unmanned system 1A according to the second embodiment includes a control device 10A, the apparatus 20, and the sensor 30. The control device 10A includes a state estimation unit 16 in addition to the configuration of the first embodiment. The state estimation unit 16 estimates a state of the apparatus 20 and a state of an operation environment on the basis of environment information acquired by the sensor information acquisition unit 11.

Figure 5:
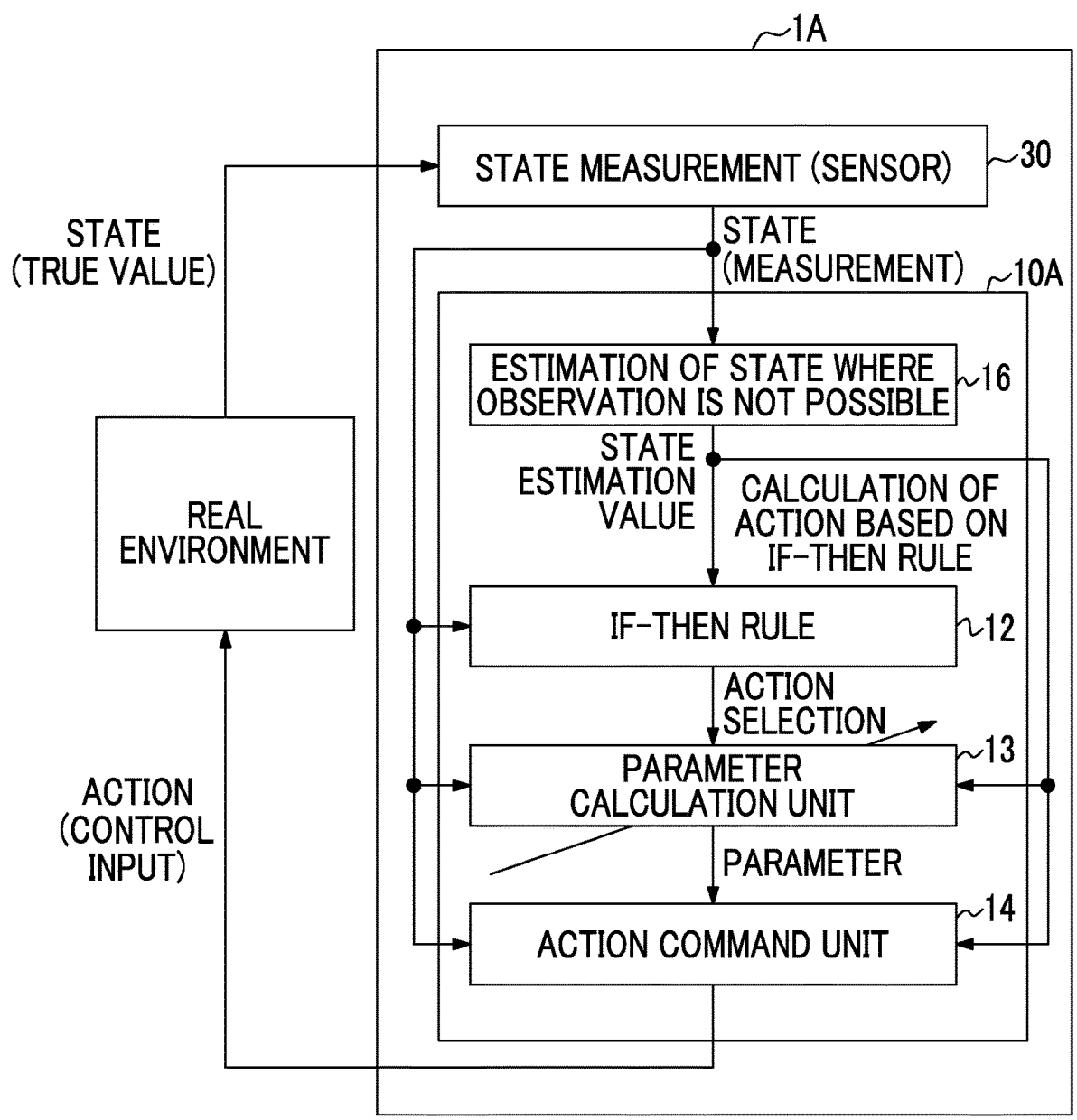
FIG. 5 is a diagram illustrating a control by the unmanned system according to the second embodiment of the present invention.

FIG. 5 is a diagram illustrating control by the unmanned system according to the second embodiment of the present invention.

First, the sensor 30 measures a state of a real environment, and outputs environment information to the control device 10A. In the control device 10A, the sensor information acquisition unit 11 acquires the environment information, and outputs the acquired environment information to the action selection unit 12, the parameter calculation unit 13, the action command unit 14, and the state estimation unit 16.

The state estimation unit 16 estimates information (estimated state information) necessary for control on the basis of the environment information. For example, in a case where the control device 10A controls an automated operation of a vehicle, the state estimation unit 16 estimates a position of another vehicle that is out of a measurement range of a sensor provided in the vehicle, such as a blind spot at an intersection. In a case where learning is repeatedly performed while giving a reward to the estimated state information estimated in this way, for example, there is a possibility that a learning model of the control device 10A may obtain an action parameter of an action of reducing a speed when entering an intersection having many blind spots. The state estimation unit 16 outputs the estimated state information to the action selection unit 12, the parameter calculation unit 13, and the action command unit 14.

The subsequent processing flow is the same as in the first embodiment. First, the action selection unit 12 selects a scheme of an action on the basis of the IF-THEN rule using at least one of the environment information or the estimated state information. Then, the parameter calculation unit 13 inputs at least one of the environment information or the estimated state information to a learning model (a NN of an actor), and calculates an action parameter. Then, the action command unit 14 generates a control signal based on the action parameter, and controls the apparatus 20. The parameter calculation unit 13 acquires environment information or estimated state information indicating a result of a current action, evaluates the action, and updates the learning model.

According to the present embodiment, it is possible to estimate a state of an environment that cannot be measured or can be measured but includes an error, and to use the result for control and updating of a learning model. For example, there is a possibility that an action parameter of a look-ahead action may be learned as the state estimation unit 16 predicts a future state.

Third Embodiment

Hereinafter, an unmanned system according to a third embodiment of the present invention will be described with reference to FIGS. 6 to 8. The third embodiment provides a method for calculating an action parameter for each of a plurality of actions that can be switched by the IF-THEN rule. In the configuration of the first embodiment, it is necessary to feed back a result obtained by reflecting an action in an environment. However, in a case where an action is switched according to the IF-THEN rule, there is a possibility that the action and an evaluation may not match in a case where an unselected action is also learned. For this reason, in the present embodiment, first, an action is selected according to the IF-THEN rule, and switching to a parameter calculation unit prepared for each action is performed in accordance with the selection. That is, N independent parameter calculation units are respectively prepared for N actions, and learning is performed only on the selected action.

Figure 6:
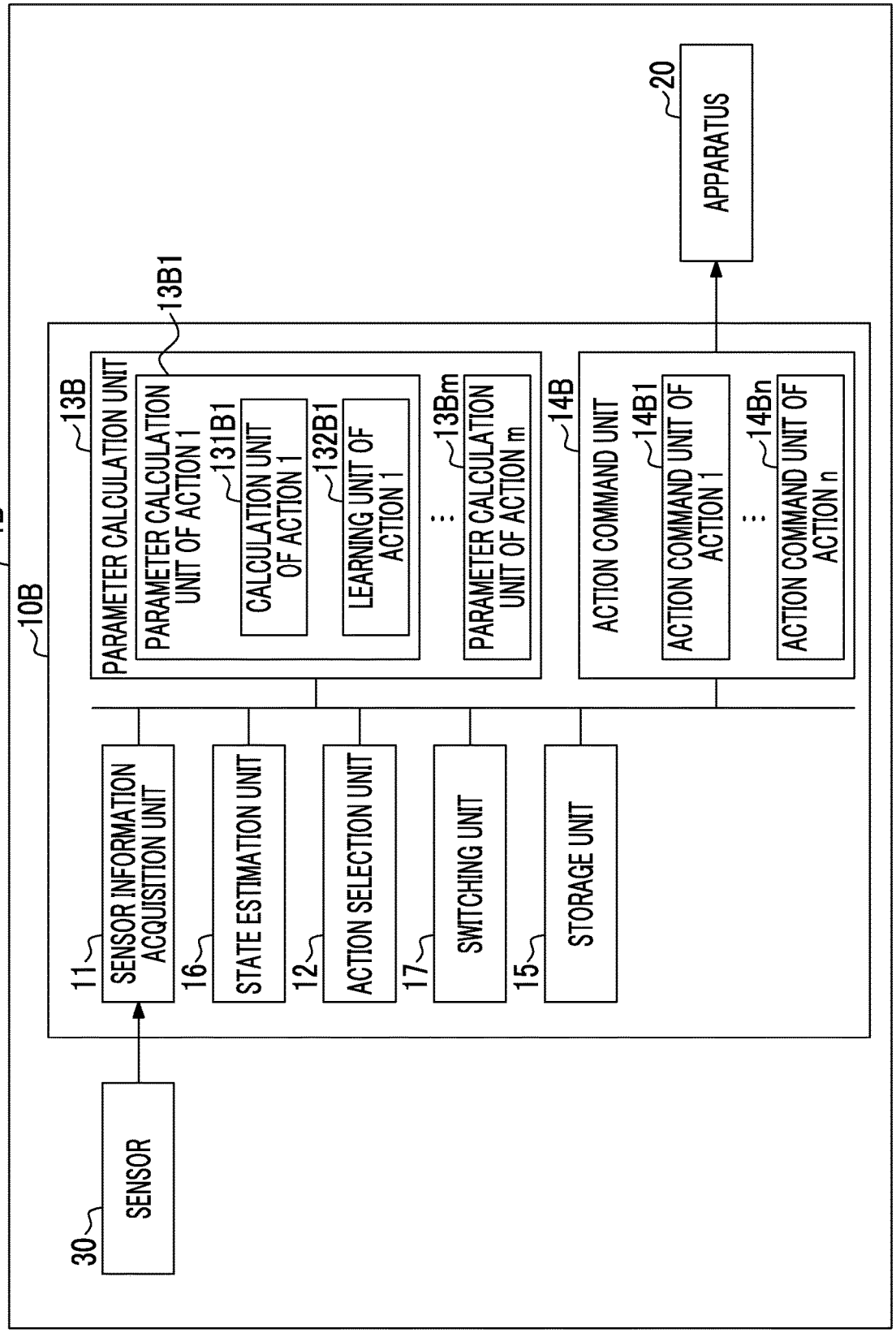
FIG. 6 is a block diagram showing an unmanned system according to a third embodiment of the present invention.

FIG. 6 is a block diagram showing the unmanned system according to the third embodiment of the present invention.

The third embodiment may be combined with any of the first embodiment and the second embodiment, but herein, a configuration in which the third embodiment is combined with the second embodiment will be described as an example. In the configuration according to the third embodiment of the present invention, the same components as those included in the unmanned system 1A according to the second embodiment are denoted by the same reference numerals, and description thereof will be omitted. An unmanned system 1B according to the third embodiment includes a control device 10B, the apparatus 20, and the sensor 30. The control device 10B includes a parameter calculation unit 13B and an action command unit 14B, instead of the parameter calculation unit 13 and the action command unit of the second embodiment. Here, it is assumed that there are n patterns in action scheme types to be selected by the IF-THEN rule. The parameter calculation unit 13B includes a parameter calculation unit 13B1 of an action 1 to a parameter calculation unit 13Bm of an action m (m≤n). The parameter calculation unit 13B1 of the action 1 includes a calculation unit 131B1 of the action 1 and a learning unit 132B1 of the action 1. The same applies to a parameter calculation unit 13B2 of an action 2 to a parameter calculation unit 13Bm of an action m. The action command unit 14B includes an action command unit 14B1 of the action 1 to an action command unit 14Bn of the action n. The control device 10B further includes a switching unit 17.

The parameter calculation unit 13B1 of the action 1 to the parameter calculation unit 13Bm of the action m are prepared for the action schemes "action 1" to "action m", respectively. The parameter calculation unit 13B1 for the action 1 and the like have a function corresponding to the parameter calculation unit 13 of the first embodiment. That is, the parameter calculation unit 13B1 of the action (the calculation unit 131B1 of the action 1) calculates an action parameter of the action scheme "action 1". The parameter calculation unit 13B1 of the action 1 (the learning unit 132B1 of the action 1)" includes a learning model for the action scheme "action 1" (an NN of an actor for the "action 1" and an NN of a critic for the "action 1"), and updates these neural networks. The same applied to the parameter calculation unit 13B2 of the action 2 to the parameter calculation unit 13Bm of the action m.

The configuration in which the parameter calculation unit 13B includes the parameter calculation unit 13B1 of the action 1 to the parameter calculation unit 13Bm of the action m (m≤n) means that the parameter calculation unit 13B may not be prepared for all action schemes (n types). That is, there may be some action schemes in which an action parameter is determined on a rule base.

The action command unit 14B of the action 1 to the action command unit 14Bn of the action n are prepared for the action schemes "action 1" to "action n", respectively. The action command unit 14B1 of the action 1 and the like have a function corresponding to the action command unit 14 of the first embodiment. That is, the action command unit 14B1 of the action 1 generates a control signal based on the action parameter for the action scheme "action 1", and outputs the control signal to the apparatus 20. The same applies to the action command unit 14B2 of the action 2 to the action command unit 14Bn of the action n. The action command unit 14B includes the action command unit 14B1 of the action 1 and the like corresponding to the number (n) of patterns of the action schemes.

The switching unit 17 selects a parameter calculation unit 13Bi of an action i corresponding to the action i selected by the action selection unit 12, an action command unit 14Bi of the action i, and performs control switching to the parameter calculation unit 13Bi of the selected action i, and the action command unit 14Bi of the action i, and the like (here, the parameter calculation unit 13Bi of the action i may not exist). That is, in a case where the action i is selected, only learning of the parameter calculation unit of the action i is performed, and learning of a learning model of a parameter calculation unit 13Bj of an action j≠i is not performed.

Next, the control of the apparatus 20 by the control device 10B will be described with reference to FIGS. 7 and 8. FIG. 7 is a diagram showing a configuration example in a case where the parameter calculation unit 13B is provided for all action schemes, and FIG. 8 is a diagram showing a configuration example in a case where the parameter calculation unit 13B is provided only for some action schemes.

Figure 7:
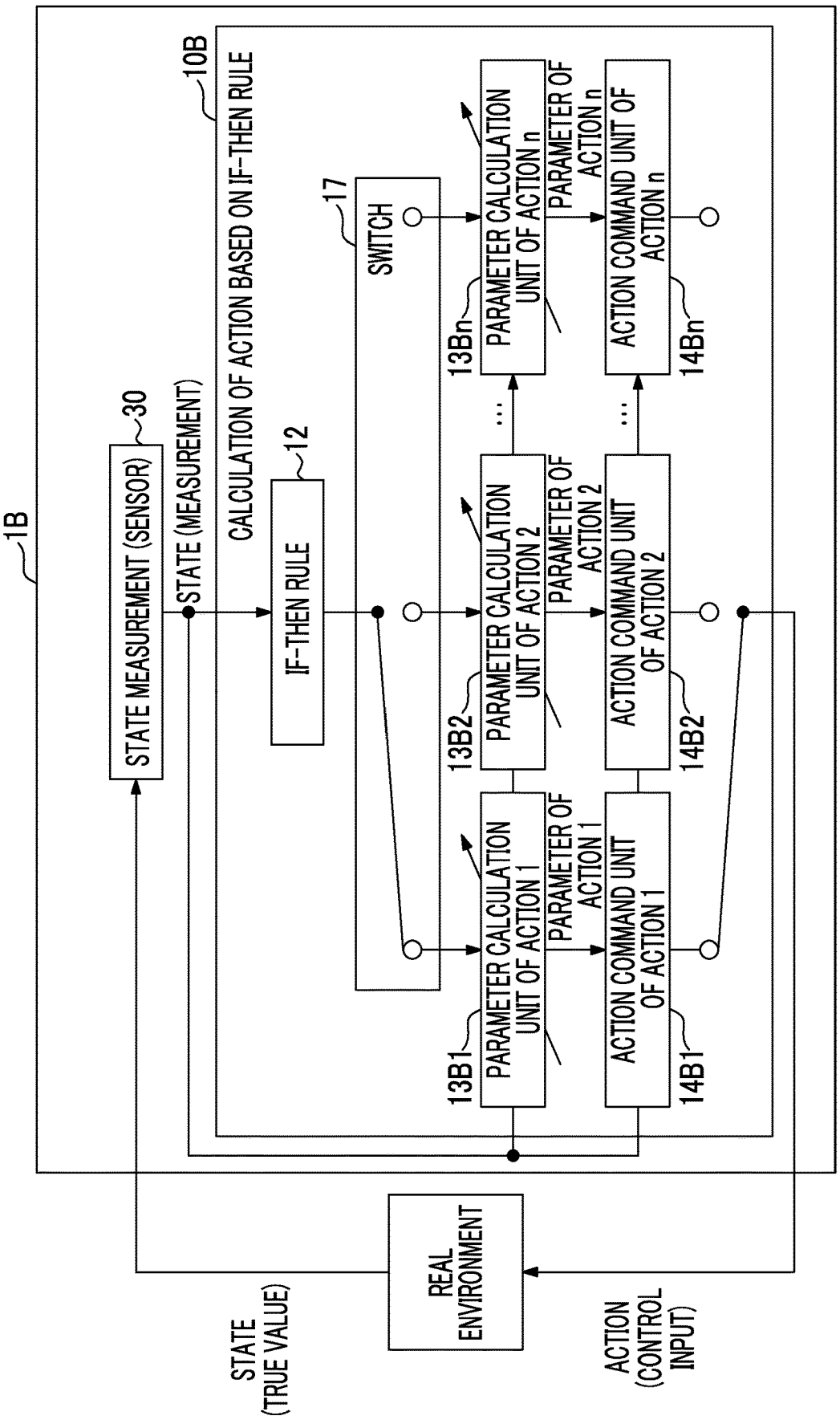
FIG. 7 is a first diagram illustrating a control by the unmanned system according to the third embodiment of the present invention.

FIG. 7 is a first diagram illustrating control by the unmanned system according to the third embodiment of the present invention.

First, the sensor 30 measures a state of a real environment, and outputs environment information to the control device 10B. In the control device 10B, the sensor information acquisition unit 11 acquires the environment information, and outputs the environment information to the action selection unit 12B, the parameter calculation unit 13B, and the action command unit 14B. As necessary, the state estimation unit 16 (not shown) estimates estimated state information, and outputs the estimated state information to the action selection unit 12B, the parameter calculation unit 13B, and the action command unit 14B.

Then, the action selection unit 12 selects an action scheme on the basis of the environment information or the estimated state information, and the IF-THEN rule.

The action selection unit 12 outputs the selection result to the switching unit 17 ("switch" in FIG. 7). The switching unit 17 performs switching to a controller (the parameter calculation unit 13i of the action i and the action command unit 14Bi of the action i) in accordance with the selection result of the action selection unit 12. For example, in a case where the action selection unit 12 selects "action 1", the switching unit 17 switches the controller to the parameter calculation unit 13B1 of the action 1. For example, in a case where the action selection unit 12 selects "action 2", the switching unit 17 switches the controller to the parameter calculation unit 13B2 of the action 2. In a case where the action selection unit 12 selects "action n", the switching unit 17 switches the controller to the parameter calculation unit 13Bn of the action n.

In a case where the controller is switched to the parameter calculation unit 13B1 of the action 1, the parameter calculation unit 13B1 calculates an action parameter of the "action 1", on the basis of the environment information or the estimated state information, and the learning model of the action 1. The parameter calculation unit 13B1 outputs a value of the action parameter to the action command unit 14B1.

The action command unit 14B1 of the action 1 generates a control signal based on the environment information (or the estimated state information as necessary) and the action parameter, and outputs the control signal to the apparatus 20.

In a case where the learning mode is set for the "action 1", the parameter calculation unit 13B1 evaluates a current action on the basis of the environment information acquired by the sensor information acquisition unit 11 or the estimated state information after the current action, and updates the learning model of the action 1 so that a better action becomes possible.

The same applies to a case where the action selection unit 12 selects "action 2" and "action n". For example, in a case where the action selection unit 12 selects "action 2", the parameter calculation unit 13B2 of the action 2 calculates an action parameter of "action 2", and updates the learning model of the action 2. The action command unit 14B2 of the action 2 controls the apparatus 20 on the basis of the action parameter calculated by the parameter calculation unit 13B2 of the action 2.

Figure 8:
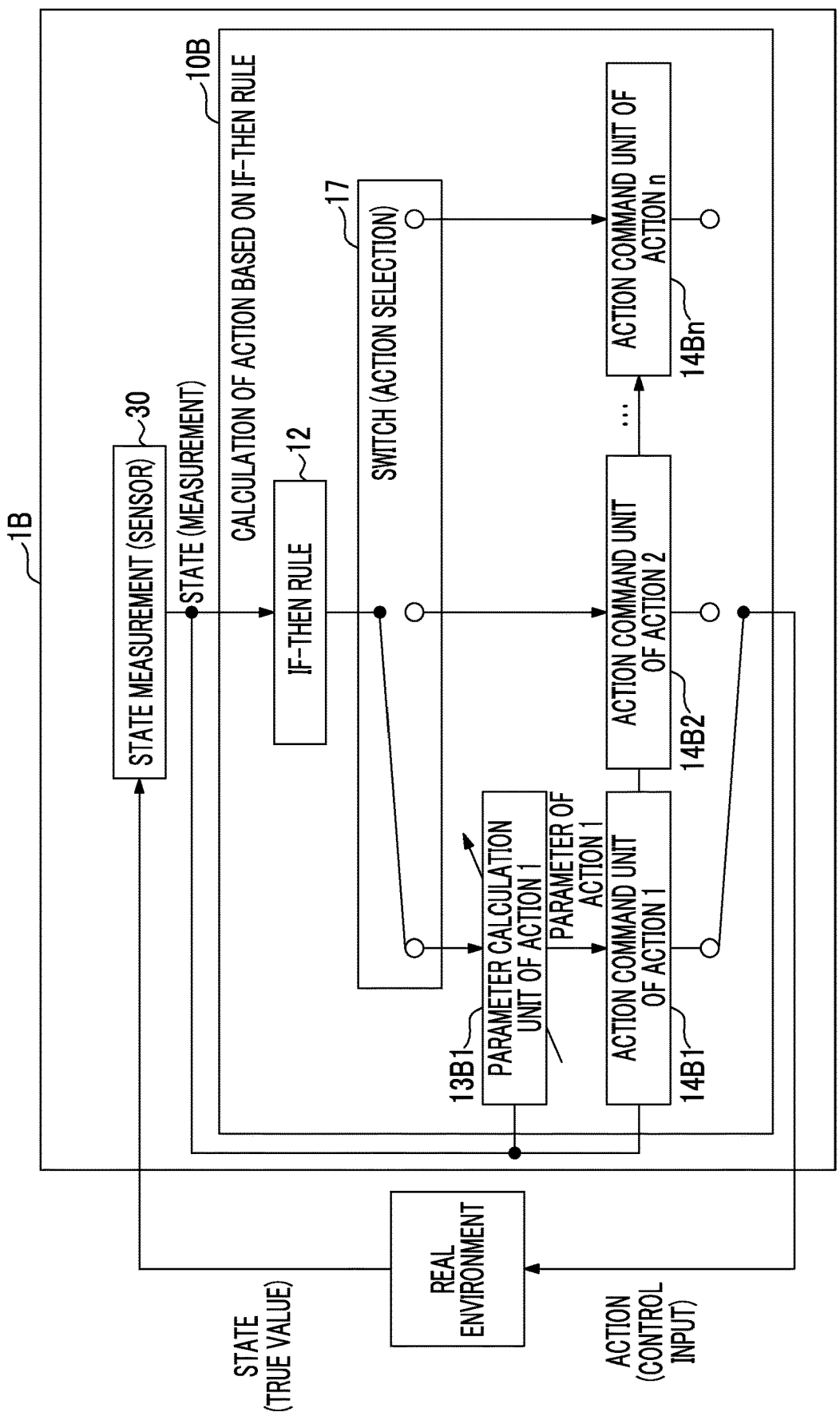
FIG. 8 is a second diagram illustrating a control by the unmanned system according to the third embodiment of the present invention.

FIG. 8 is a second diagram illustrating control by the unmanned system according to the third embodiment of the present invention.

In the control device 10B shown in FIG. 8, similarly, the apparatus 20 is controlled in accordance with the same flow as the processing flow described in FIG. 7. However, the control device 10B shown in FIG. 8 does not include the parameter calculation unit 13B2 of the action 2 and the parameter calculation unit 13Bn of the action n. In the configuration of FIG. 8, in a case where the action selection unit 12 selects "action 2", the action command unit 14B2 of the action 2 generates a control signal for "action 2" on the basis of a predetermined rule, and controls the apparatus 20. In a case where the action selection unit 12 selects "action n", the action command unit 14Bn of the action n generates a control signal for "action n" on the basis of a predetermined rule, and controls the apparatus 20.

According to the present embodiment, it is possible to acquire an optimal action parameter by reinforcement learning, for each of a plurality of actions. In a case where it is not necessary to learn an optimal value of an action parameter for all actions, the parameter calculation unit 13Bi of the action i may be prepared only for a necessary action as shown in FIG. 8. Thus, it is possible to reduce a processing load of the control device 10B, and to improve a behavior of the apparatus 20 by obtaining an optimal action parameter while saving necessary computer resources.

Fourth Embodiment

A fourth embodiment provides an example of a learning model updating process for calculating an action parameter in the first to third embodiments. Hereinafter, a method of realizing the parameter calculation unit 13 by a DDPG will be described with reference to FIG. 9, using the configuration of the second embodiment as an example.

Figure 9:
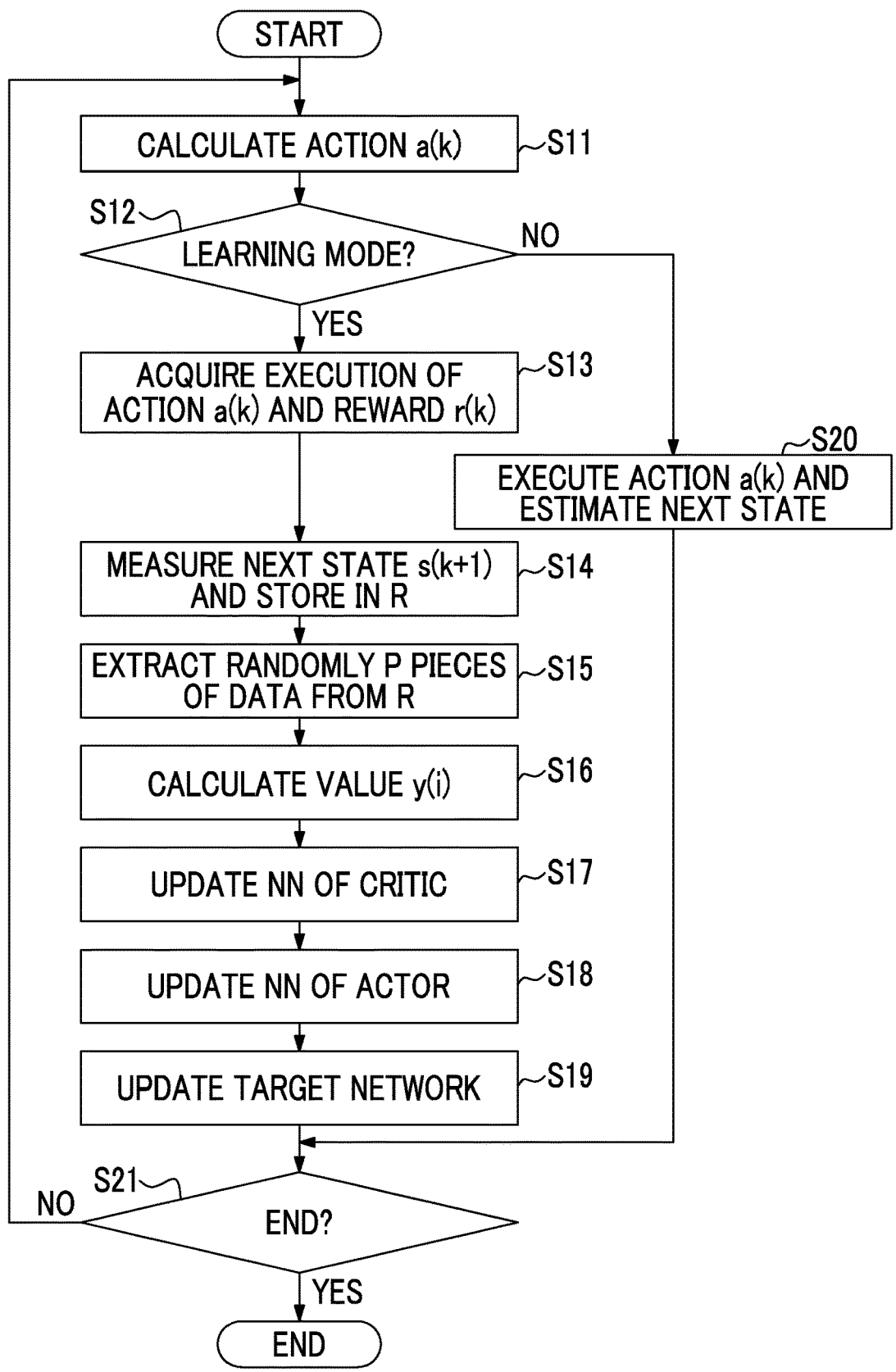
FIG. 9 is a flowchart illustrating an example of a learning model updating process by an unmanned system according to a fourth embodiment of the present invention.

FIG. 9 is a flowchart illustrating an example of a learning model updating process performed by a control device according to the fourth embodiment of the present invention.

First, the action selection unit 12 selects an action scheme in accordance with state information (environment information, estimated state information), and the calculation unit 131 calculates an action a(k) in the scheme on the basis of the state information and a learning model (an NN of an actor) (step S11). Specifically, the calculation unit 131 calculates a(k) by the following equation (1).

$$a(k)=\mu(s(k)|w)+n(k) \quad (1)$$

Here, $\mu$ is a multilayer neural network having a weight w in which a state vector s(k) in a current time point k is used as an input. For example, ReLU is applied to an activation function. Here, $\mu(s(k)|w)$ is a deterministic value, but the action a(k) becomes a value having variation due to an influence of the second term n(k) on the right side (for example, white Gaussian noise with mean 0 and variance Σ). The calculation unit 131 outputs the action a(k) (action parameter) to the action command unit 14.

Then, the parameter calculation unit 13 determines whether or not the mode is a learning mode (step S12). For example, a user performs setting of whether or not the mode is the learning mode for the control device 10A. On the basis of the setting, the parameter calculation unit 13 performs the determination in step S12. In the case of the learning mode (step S12; Yes), the action command unit controls the apparatus 20 on the basis of the action a(k). That is, the action a(k) is executed, so that the environment is changed. Then, the sensor 30 measures a real environment, and the sensor information acquisition unit 11 acquires environment information. The learning unit 132 acquires a reward r(k) on the basis of the environment information and state information estimated by the state estimation unit 16 (step S13). The reward r(k) is a value set for a state s(k) at the time point k.

Qualitatively, for example, a positive reward is set for a desirable state s(k), and a negative reward is set for an undesirable state s(k).

Then, the sensor 30 measures the real environment, and the sensor information acquisition unit 11 acquires environment information (state vector s(k+1)) at the next time point k+1. Alternatively, the state estimation unit 16 estimates the state s(k+1) at the time point k+1. The parameter calculation unit 13 stores the state s(k+1) and the like in a variable R (step S14). More specifically, the learning unit 132 records a data set including the state s(k), the action a(k), the reward r(k), and the state s(k+1) in the storage unit 15, in addition to a past information storage variable R.

Then, the learning unit 132 randomly extracts P pieces of data from the variable R (step S15). The P data sets (s(i), a(i), r(i), s(i+1)), i=1, 2, . . . , P that are extracted in this way are called a mini-batch.

Then, the learning unit 132 calculates a value y(i) using the following equation (2) (step S16).

$$y(i)=r(i)+\gamma Q'(s(i+1),\mu'(s(i+1)|w')|w_Q'), i=1,2,\ldots,P \quad (2)$$

Here, Q is a state value function, and the state s and the action $\mu$ are input as in the above equation (2). In the DDPG, a state value is modeled by a neural network similarly to an action, and a weight $w_Q$ is updated for estimation. Q' in the above equation is a neural network called a target network, and $w_Q \neq w_Q'$. Similarly, $\mu'$ is a target network of the action neural network $\mu$, and $w \neq w'$. Q is an NN of a critic, and $\mu$ is an NN of an actor.

Then, the learning unit 132 updates the NN of the critic (step S17). Specifically, the learning unit 132 updates the weight $w_Q$ of the state value function so as to minimize a loss function expressed by the following equation (3). This minimization may be performed using a known method such as a gradient descent method or Adam.

[Equation 1]

$$L = \frac{1}{P}\sum_{i=1}^{P}(y(i) - Q(s(i), a(i) | w_Q))^2 \quad (3)$$

Then, the learning unit 132 updates the NN of the actor (step S18). Specifically, the learning unit 132 updates the weight w of $\mu$ by the following equation (4) using a known method such as a gradient descent, using Q updated according to the above-described policy as an evaluation index.

[Equation 2]

$$w := w + \beta \frac{1}{N}\sum_{i=1}^{N}\frac{\partial Q}{\partial w}|_{s=s(k),a=a(k)} \quad (4)$$

Then, the learning unit 132 updates the target network (step S19). Specifically, the learning unit 132 updates the target network by the following equation (5).

$$w'=\tau w+(1-\tau)w', w_Q'=\tau w_Q+(1-\tau)w_Q' \quad (5)$$

By performing the updating with a weighted average of the weight w of the NN of the current actor and the weight $w_Q$ of the NN of the critic, a sudden change in the weight is suppressed. Thus, the weight of the NN of the actor and the weight of the NN of the critic are updated to w' and $w_Q'$, respectively.

In a case where it is determined in step S12 that the mode is not the learning mode (step S12; No), the action command unit 14 controls the apparatus 20 on the basis of the action a(k). The sensor information acquisition unit 11 acquires the environment information measured by the sensor 30, and the state estimation unit 16 estimates the next estimated state information (state s(k+1) at the time point k+1) (step S20).

Next, it is determined whether or not the control of the apparatus 20 is to be terminated (step S21), and in a case where it is determined that the control is to be ended (step S21; Yes), the procedure of this flowchart is terminated. In a case the control is not to be terminated (step S21; No), the processes of step S11 and thereafter are repeated.

According to the present embodiment, it is possible to set an action parameter that is frequently determined in the related art on the basis of the IF-THEN rule to an optimal value in accordance with a state. Accordingly, it is possible to improve performance of the unmanned system as compared with the related art rule base. By using deep learning in constructing a learning model for determining an action parameter, it is possible to automatically acquire a parameter to be learned without necessity of human design, and in particular, it is possible to acquire complicated parameters that are difficult for humans to design and parameters that cannot be noticed by humans, to thereby acquire a more accurate learning model.

Fifth Embodiment

Next, a specific example in which the action parameter calculation and the learning method described in the first to fourth embodiments is applied to an automated operation of an automated aerial vehicle (AAV) will be described.

Figure 10:
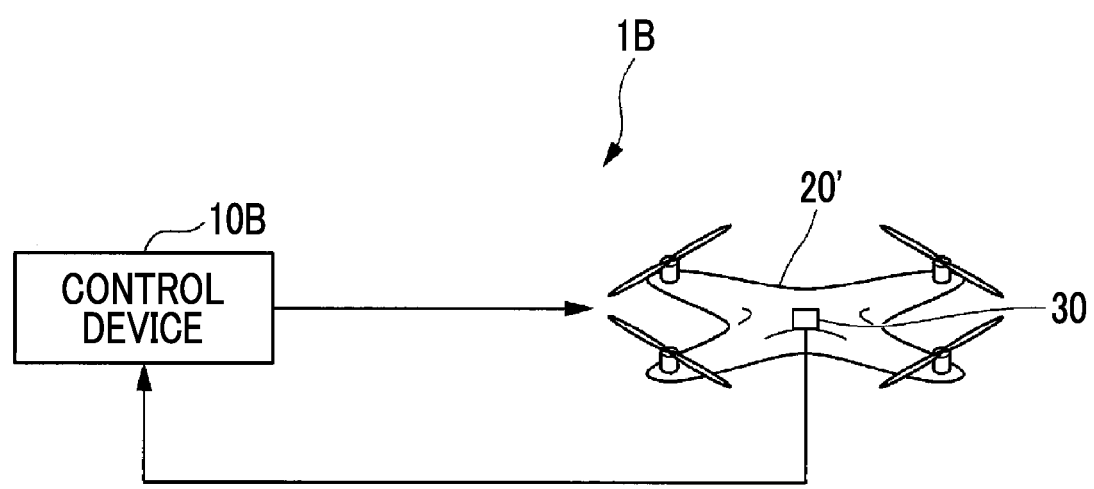
FIG. 10 is a diagram showing an example of an unmanned system according to a fifth embodiment of the present invention.

FIG. 10 is a diagram showing an example of an unmanned system according to a fifth embodiment of the present invention.

An AAV 20' includes a sensor 30. The sensor 30 includes, for example, a camera or a laser radar used for detecting an obstacle, and a GPS, a gyro sensor, an atmospheric pressure sensor, an acceleration sensor, and the like necessary for moving a planned route at a desired speed. In the control device 10B, the sensor information acquisition unit 11 acquires environment information measured by the camera or the laser radar. The sensor information acquisition unit 11 may have a function of analyzing an image captured by the camera to detect the presence of an obstacle included in the image, and a function of measuring a time from irradiation of laser to reception of reflected light, for example.

For example, the state estimation unit 16 may estimate position information of the AAV 20' using a Kalman filter in order to smooth an error included in the position information obtained by GPS and estimating the position information in a measurement interval. Thus, it is possible to construct a learning model in which a more accurate state is reflected, and to calculate an action parameter based on a more accurate learning model. Alternatively, in an environment where a GPS signal cannot be received, the state estimation unit 16 may estimate its own position by a method such as simultaneous localization and mapping (SLAM) using information measured by the laser radar or the camera. Thus, the control device 10B can control the AAV 20' even in an environment where measurement of its own position by GPS is not possible.

The action selection unit 12 selects an action scheme such as "going straight ahead", "turning", and "hovering" on the basis of the environment information. For example, in a case where the radar detection result indicates the presence of an obstacle, the action selection unit 12 selects "turning" to avoid the obstacle. In this case, the parameter calculation unit 13B calculates, for example, an action parameter "turning radius". The action command unit 14B generates a control signal for performing turning with a turning radius calculated by the parameter calculation unit 13 (for example, how much a rotation speed of a front wing (propeller) on a turning side is increased, and how much a rotation speed of an front wing on an opposite side is decreased), and outputs the control signal to the AAV 20'.

The action parameter calculated by the parameter calculation unit 13B may be an action parameter related to a part of the action scheme selected by the action selection unit 12. For example, in the turning of the AAV 20', an action parameter of "turning radius" is determined by the parameter calculation unit 13B, but an action parameter of "turning start timing" may be determined on a rule base. As described below with reference to an example, the parameter calculation unit 13B may calculate a correction amount of an action parameter in the action scheme selected by the action selection unit 12.

The control device 10B includes the parameter calculation unit 13B only for "turning", and for other actions such as "going straight ahead" and "hovering", the action command unit 14B commands predetermined operation content on a rule base. The control device 10B may be built in the AAV 20'.

Figure 11:
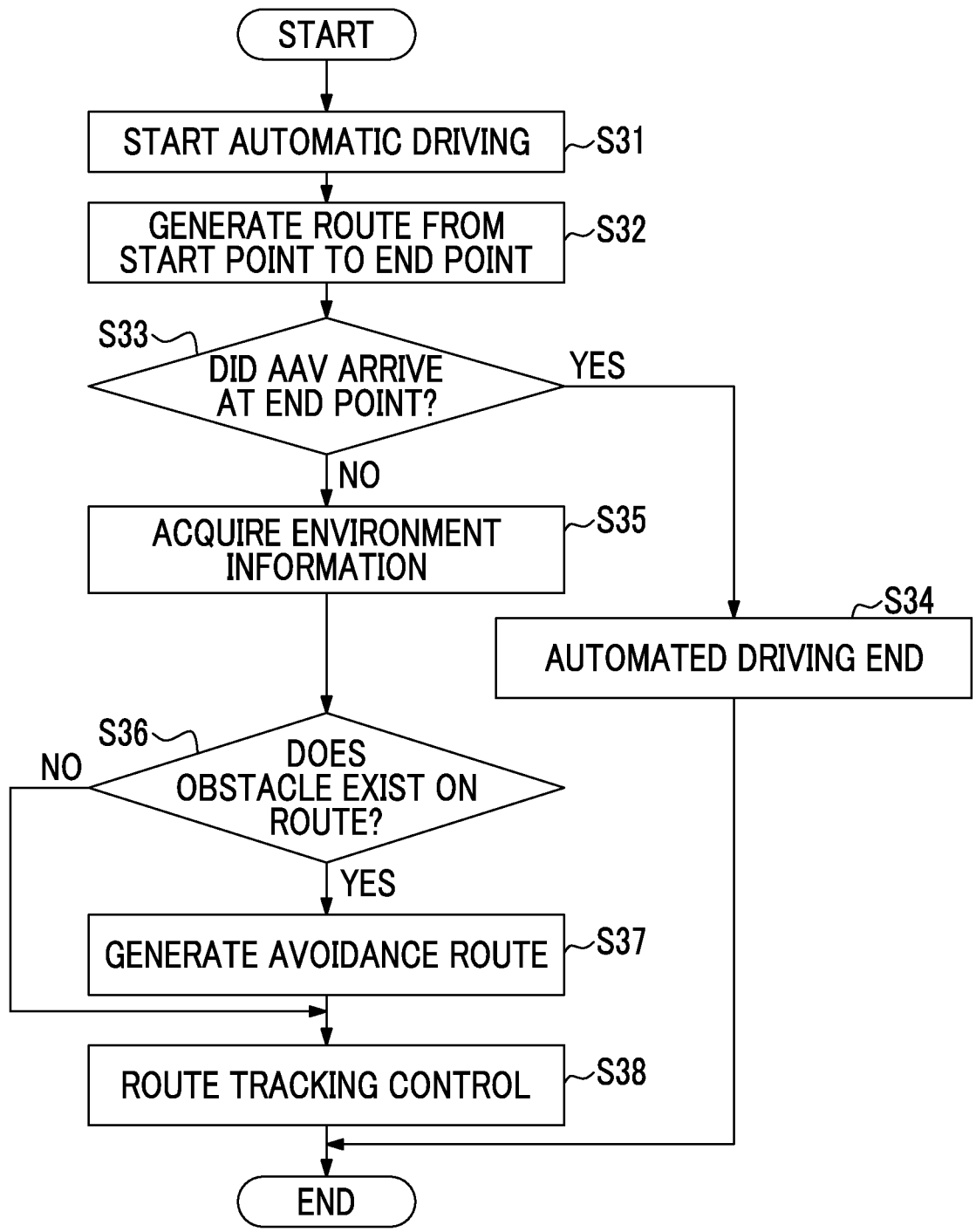
FIG. 11 is a flowchart illustrating an example of a control method of the unmanned system according to the fifth embodiment of the present invention.

FIG. 11 is a flowchart illustrating an example of a control method of the unmanned system according to the fifth embodiment of the present invention.

As a specific example, a control for causing the AAV 20' to automatically fly to a target point while avoiding an obstacle by an action of "turning" is considered. The control device 10B has a function of performing various actions necessary for an automated operation of the AAV 20', but description other than description of the turning is omitted.

First, position information of the target point is input to the control device 10B, and the automated operation is started (step S31). Then, the control device 10B generates a flight path of the AAV 20' from a start point to an end point (step S32). Thereafter, the control device 10B starts flight of the AAV 20'. The sensor information acquisition unit 11 acquires position information of the AAV 20' from, for example, a GPS receiver included in the AAV 20'. The action selection unit 12 determines whether or not the AAV 20' has arrived at the end point (step S33). In a case where the AAV 20' has arrived at the end point (step S33; Yes), the action selection unit 12 selects ending of the automated operation, and the action command unit 14B ends the automated operation (step S34).

In a case where the AAV 20' has not arrived at the end point (step S33; No), the sensor information acquisition unit 11 acquires environment information from the sensor 30 such as a camera, a laser radar, a GPS, a gyro sensor, an atmospheric pressure sensor, and an acceleration sensor (step S35). The action selection unit 12 determines whether or not there is an obstacle on the route on the basis of the environment information measured by the camera or the laser radar or state information estimated by the state estimation unit 16 (step S36). In a case where there is no obstacle (step S36; No), the action selection unit 12 selects, for example, an action scheme of "going straight ahead" by a route tracking control. Then, the action command unit 14B (in which the parameter calculation unit 13Bi is not prepared for "going straight ahead") causes the AAV 20' to proceed straight along the generated route. For example, the action command unit 14B generates a control signal so that the AAV 20' tracks the route generated in step S32 and controls the AAV 20' while maintaining a predetermined altitude, a predetermined posture, and a predetermined flying speed using the environment information measured by the GPS, the gyro sensor, the atmospheric pressure sensor, the acceleration sensor, and the like (step S38).

In a case where there is the obstacle (step S36; Yes), the action selection unit 12 selects the action scheme of "turning". Then, the parameter calculation unit 13B generates an avoidance route (step S37). In the generation of the avoidance route, it is assumed that the turning radius is changed in accordance with a distance between the AAV 20' and the obstacle and the turning is steeper (the turning radius is smaller) as the distance is shorter. Herein, a turning radius determining process will be described with reference to FIG. 12.

Figure 12:
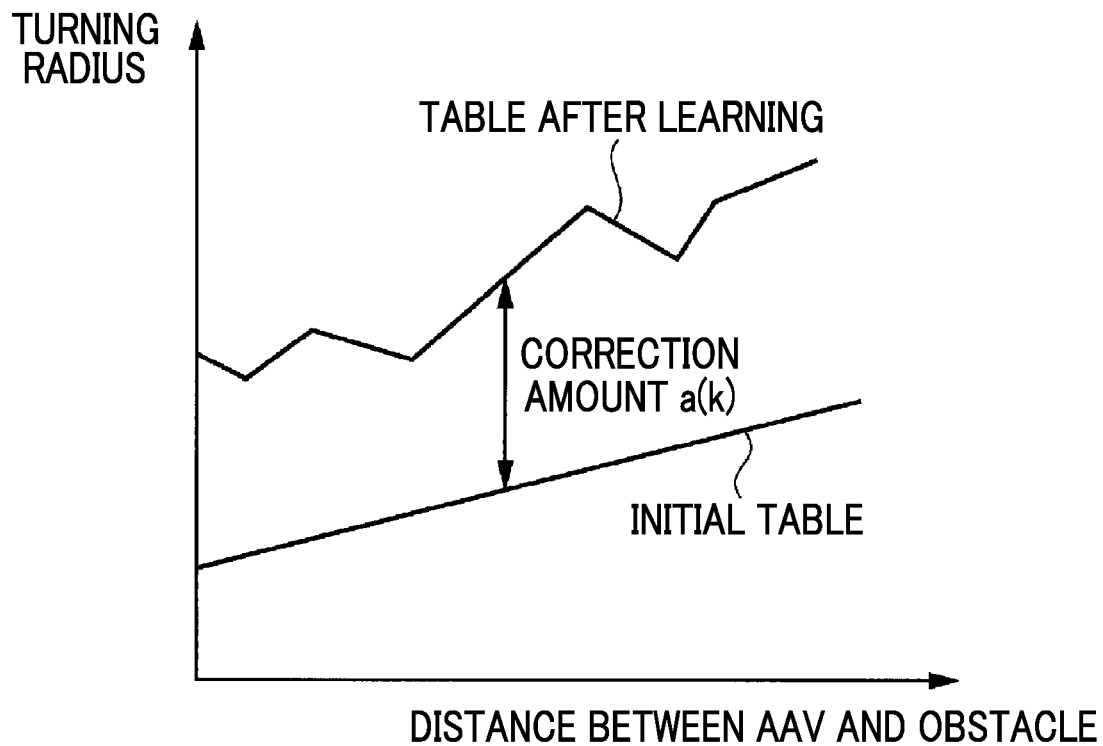
FIG. 12 is a diagram illustrating an action parameter determining process according to the fifth embodiment of the present invention.

FIG. 12 is a diagram illustrating an action parameter determining process according to the fifth embodiment of the present invention. An initial value of the turning radius with respect to the distance to the obstacle is shown in a graph "initial table" of an initial table in FIG. 12. However, the initial value is not always an appropriate value in a current operation. Accordingly, a method for repeating learning by the parameter calculation unit 13B while an automated operation is being actually performed and correcting the turning radius of the initial table in accordance with to the result may be considered. A corrected relationship between the distance from the AAV 20' to the obstacle and the turning radius is shown in a graph "table after learning". A correction amount at this time is set as $a(k)=\mu(s(k)|w)+n(k)$, and the avoidance route is generated with the turning radius $f(k)=f\_0(s(k))+a(k)$ to perform the automated operation.

Here, $f\_0(s(k))$ represents the graph "initial table". On the other hand, in the method described in the fourth embodiment, reward setting is performed, for example, by giving a good reward to the turning radius in a case where it is possible to cause the action $a(k)$ (in this example, the correction amount of the turning radius) to return to the initially generated route without difficulty as soon as possible after avoiding an obstacle, for example, and the learning model of the correction amount in the initial table is updated. The turning radius after the correction corresponds to the graph "table after learning". The parameter calculation unit 13B generates an avoidance route by using the turning radius after learning learned in this way. The action command unit 14B causes the AAV 20' to fly along the avoidance route.

As illustrated in the fifth embodiment, by preparing an initial table with respect to a certain action parameter (turning radius) and configuring the correction amount to be learned, it is possible to converge the learning in a shorter time compared with a case where no initial value is given.

In the description of FIG. 11 described above, a configuration in which the action parameter is calculated only for "turning" is shown, but a configuration in which the action parameter may be calculated for all other actions such as "going straight ahead", "hovering", and the like may be used (FIG. 7). It goes without saying that it is possible to apply the unmanned system 1 of the first embodiment or the unmanned system 1A of the second embodiment to the automated driving of the AAV 20'.

Figure 13:
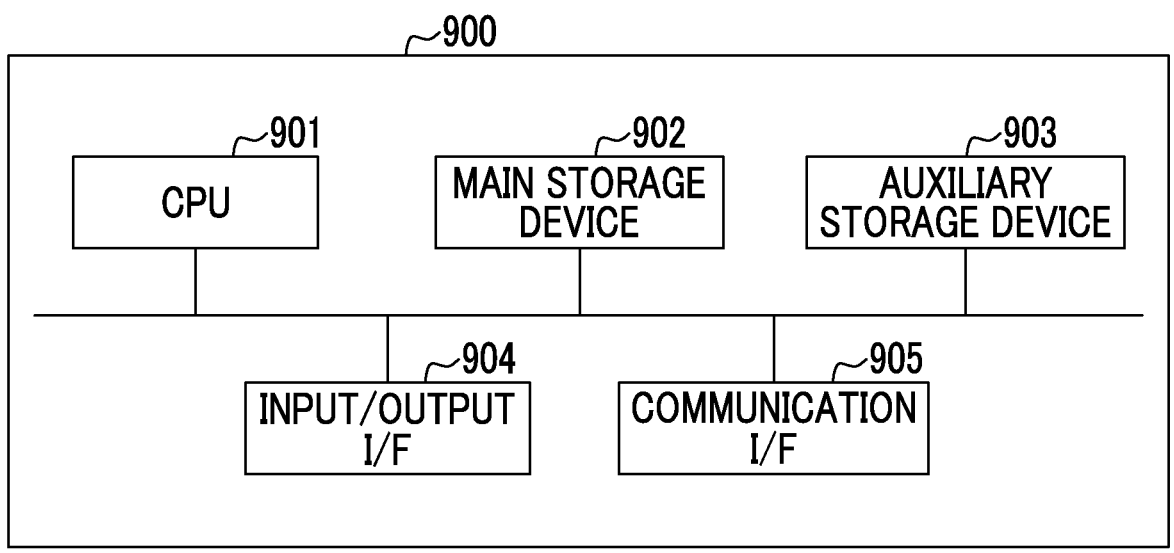
FIG. 13 is a diagram illustrating an example of a hardware configuration of a control device according to the first to fifth embodiments of the present invention.

FIG. 13 is a diagram illustrating an example of a hardware configuration of the control device according to the first to fifth embodiments of the present invention.

A computer 900 is a computer device including a central processing unit (CPU) 901, a main storage device 902, an auxiliary storage device 903, an input/output interface 904, and a communication interface 905. The computer 900 may include a processor such as a micro processing unit (MPU) or a graphics processing unit (GPU), instead of the CPU 901. The above-described control devices 10, 10A, and 10B are mounted in the computer 900. A operation of each of the processing units described above is stored in the auxiliary storage device 903 in the form of a program. The CPU 901 reads out a program from the auxiliary storage device 903, develops the read-out program into the main storage device 902, and executes the above-described processes in accordance with the program. The CPU 901 secures a storage area corresponding to the storage unit 15 in the main storage device 902 in accordance with the program. The CPU 901 secures a storage area for storing data that is being processed in the auxiliary storage device 903 in accordance with the program.

In at least one embodiment, the auxiliary storage device 903 is an example of a non-transitory tangible medium. Other examples of the non-transitory tangible medium include a magnetic disc, a magneto-optical disc, a CD-ROM, a DVD-ROM, and a semiconductor memory to be connected through the input/output interface 904. In a case where this program is distributed to the computer 900 through a communication line, the computer 900 that receives the program may develop the program into the main storage device 902 to execute the above-described processes. The program may be a program for realizing a part of the functions described above. Further, the program may be a program that realizes the above-described functions in combination with another program already stored in the auxiliary storage device 903, that is, a so-called difference file (difference program).

All or a part of the functions of the control device 10 and the like may be realized using hardware such as a microcomputer, an LSI (Large Scale Integration), an ASIC (Application Specific Integrated Circuit), a PLD (Programmable Logic Device), or an FPGA (Field-Programmable Gate Array).

In addition, the components in the above-described embodiments may be appropriately replaced with known components without departing from the concept of the present invention. The technical scope of the present invention is not limited to the above embodiments, and various modifications may be made without departing from the concept of the present invention.

The switching unit 17 is an example of a first switching unit and a second switching unit. The action command unit 14Bi ($1 \leq i \leq n$) for which the parameter calculation unit 13Bi corresponding thereto does not exist is an example of an operation control unit. The environment information and the estimated state information are examples of the state information. The action selection unit 12 is an example of an operation selection unit. The parameter calculation units 13 and 13B are examples of an operation parameter calculation unit. The action command units 14 and 14B are examples of an operation command unit.

Application targets of the control device of the first to fourth embodiments is not limited to an unmanned system related to a moving object such as an aircraft, a vehicle, a ship, and a railway. For example, the control device of the first to fourth embodiments may be used for controlling an apparatus (turbine, boiler, compressor, or the like) such as a plant. In control of such an apparatus, similarly, it is possible to achieve predictability and understandability of the control (decision making), and adaptability, in addition to improvement of adaptivity, optimality, and performance of the control for a situation.

The basic concept of the action parameter calculation in the control device 10 may be used for a decision making system without actually controlling the apparatus. For example, the decision making system receives input of parameters necessary for decision making, determines a decision making scheme on a rule base, and determines variable parameters in the scheme using a learning model constructed by reinforcement learning. The decision making system evaluates the result of the decision made in this way and updates the learning model. For example, in a case where a decision making system is applied to a computer device indicating shogi, a function corresponding to the sensor information acquisition unit 11 acquires disposition information of pieces of a shogi board, and a function corresponding to the action selection unit 12 determines the type of a moving piece such as a pawn, a rook, or the like, and a function corresponding to the action command unit 14 specifically determines the number of squares to move the piece by a mathematical formula or the like. A function corresponding to the parameter calculation unit 13 adjusts the mathematical formula or like with higher accuracy.

INDUSTRIAL APPLICABILITY

According to the control device, the unmanned system, the control method, and the program described above, it is possible to achieve both easy understanding of control and performance improvement.

REFERENCE SIGNS LIST

1: unmanned system
10, 10A, 10B: control device
11: sensor information acquisition unit
12: action selection unit
13, 13B1, 13B2, 13Bm: parameter calculation unit
14, 14B1, 14B2, 14Bn: action command unit
15: storage unit
16: state estimation unit
17: switching unit
131, 131B1, 131B2, 131Bm: calculation unit
132, 132B1, 132B2, 132Bm: learning unit
20: apparatus
30: sensor

The invention claimed is:

1. A control device comprising:
a non-transitory tangible medium;
a processor configured to execute a program stored in the non-transitory tangible medium to cause the control device to:
acquire, from a sensor, environment information, wherein the environment information comprises a state information of an apparatus and a state of an operation environment of the apparatus, wherein the apparatus is a moving object which is unmanned, and wherein the sensor includes a detection sensor that detects an obstacle and a position sensor that measures a position of the apparatus;
select an action scheme of the apparatus based on a rule base using the state information or the state of the environment;
calculate a parameter for determining content of an action in the action scheme on the basis of any of the environment information inputted to an actor neural network of a learning model;
output a control signal to the apparatus based on the parameter, wherein the control signal causes the apparatus to execute the action;
evaluate, by a critic neural network of the learning model, the action based on a value of the parameter;
update the learning model on the basis of the evaluation, wherein the updating the learning model comprises learning the action of the apparatus executing using the parameter and the evaluation;
update the actor neural network and the critic neural network by a deep deterministic policy gradient (DDPG);
detect a presence of the obstacle based on information detected by the detection sensor;
select an action of avoiding the obstacle, as the action scheme, if the obstacle is detected, and to select an action of causing the apparatus to proceed straight along a route to a destination, as the action scheme, if the obstacle is not detected;
in response to selection of the action of avoiding the obstacle, calculate a parameter indicating an avoidance route of avoiding the obstacle on the basis of the position of the apparatus measured by the position sensor and a distance to the obstacle detected by the detection sensor, wherein the parameter indicating the avoidance route is calculated as a correction amount for an initial value which corresponds to the distance to the obstacle as indicated in an initial table; and
cause the apparatus to move along the avoidance route indicated by the parameter calculated if the action of avoiding the obstacle is selected, and to cause the apparatus to move along the route to the destination if the action of causing the apparatus to proceed straight is selected.

2. The control device according to claim 1, wherein the processor is further configured to further cause the control device to:
calculate the correction amount of the parameter on the basis of the state information and the learning model.

3. The control device according to claim 1, wherein the state information is estimated on the basis of environment information.

4. The control device according to claim 1, wherein the parameter comprises one or more parameters, and calculating the parameter comprises calculating the one or more parameters for each of a plurality of actions that can be switched by the rule base.

5. The control device according to claim 4, wherein learning model comprises one or more learning models, wherein the action comprises one or more actions of one or more action schemes, and wherein any of the environment information is inputted to the one or more learning models of the one or more actions.

6. An unmanned system comprising:
the control device according to claim 1; and
an apparatus controlled by the control device.

7. A control method comprising:
acquiring, from a sensor, environment information, wherein the environment information comprises a state information of an apparatus and a state of an operation environment of the apparatus, wherein the apparatus is a moving object which is unmanned, and wherein the sensor includes a detection sensor that detects an obstacle and a position sensor that measures a position of the apparatus;

selecting an action scheme of an apparatus based on a rule base using the state information or the state of the environment;

calculating a parameter for determining content of an action in the action scheme of an apparatus based on a rule base using the state information or a state of the environment inputted to an actor neural network of a learning model;

outputting a control signal to the apparatus based on the parameter, wherein the control signals causes the apparatus to execute the action;

evaluating, by a critic neural network of the learning model, the action based on a value of the parameter;

updating the learning model in the basis of the evaluation, wherein the updating the learning model comprises learning the action of the apparatus executing using the parameter and the evaluation;

updating the actor neural network and the critic neural network by a deep deterministic policy gradient (DDPG);

detecting a presence of the obstacle based on information detected by the detection sensor;

selecting an action of avoiding the obstacle, as the action scheme, if the obstacle is detected, and to select an action of causing the apparatus to proceed straight along a route to a destination, as the action scheme, if the obstacle is not detected;

in response to selection of the action of avoiding the obstacle, calculating a parameter indicating an avoidance route of avoiding the obstacle on the basis of the position of the apparatus measured by the position sensor and a distance to the obstacle detected by the detection sensor, wherein the parameter indicating the avoidance route is calculated as a correction amount for an initial value which corresponds to the distance to the obstacle as indicated in an initial table; and causing the apparatus to move along the avoidance route indicated by the parameter calculated if the action of avoiding the obstacle is selected, and to cause the apparatus to move along the route to the destination if the action of causing the apparatus to proceed straight is selected.

8. A computer, comprising:

means for acquiring, from a sensor, environment information, wherein the environment information comprises a state information of an apparatus and a state of an operation environment of the apparatus, wherein the apparatus is a moving object which is unmanned, and wherein the sensor includes a detection sensor that detects an obstacle and a position sensor that measures a position of the apparatus;

means for selecting an action scheme of an apparatus based on a rule base using the state information or the state of the environment;

means for calculating a parameter for determining content of an action in the action scheme on the basis of any of the environment information inputted to an actor neural network of a learning model;

means for outputting a control signal to the apparatus based on the parameter, wherein the control signal causes the apparatus to execute the action;

means for evaluating, by a critic neural network of the learning model, the action based on a value of the parameter;

means for updating the learning model on the basis of the evaluation, wherein the updating the learning model comprises learning the action of the apparatus executing using the parameter and the evaluation;

means for updating the actor neural network and the critic neural network by a deep deterministic policy gradient (DDPG);

means for detecting a presence of the obstacle based on information detected by the detection sensor;

means for selecting an action of avoiding the obstacle, as the action scheme, if the obstacle is detected, and to select an action of causing the apparatus to proceed straight along a route to a destination, as the action scheme, if the obstacle is not detected;

in response to selection of the action of avoiding the obstacle, means for calculating a parameter indicating an avoidance route of avoiding the obstacle on the basis of the position of the apparatus measured by the position sensor and a distance to the obstacle detected by the detection sensor, wherein the parameter indicating the avoidance route is calculated as a correction amount for an initial value which corresponds to the distance to the obstacle as indicated in an initial table; and means for causing the apparatus to move along the avoidance route indicated by the parameter calculated if the action of avoiding the obstacle is selected, and to cause the apparatus to move along the route to the destination if the action of causing the apparatus to proceed straight is selected.

* * * * *